No. 608,348. Patented Aug. 2, 1898.
J. M. STADEL.
FISH HOOK.
(Application filed July 9, 1897.)
(No Model.)
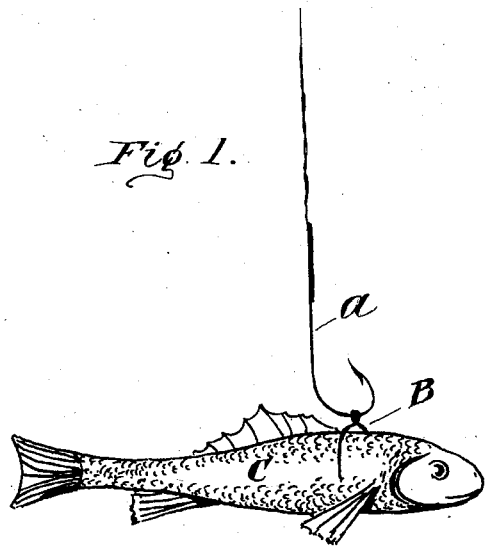
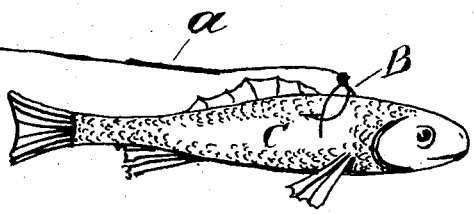
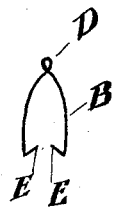
Witnesses
Walter Bacon
Harry Whiteman
Inventor
J. Martin Stadel.
THE NORRIS PETERS CO., PHOTO-LITHO., WASHINGTON, D. C.

UNITED STATES PATENT OFFICE.

JOHN MARTIN STADEL, OF WILMINGTON, DELAWARE.

FISH-HOOK.

SPECIFICATION forming part of Letters Patent No. 608,348, dated August 2, 1898.

Application filed July 9, 1897. Serial No. 643,956. (No model.)

*To all whom it may concern:*

Be it known that I, JOHN MARTIN STADEL, residing at Wilmington, in the county of New Castle and State of Delaware, have invented an Improved Fishing-Hook, of which the following, taken in connection with the accompanying drawings, is a full, clear, and exact description.

My invention relates to improvements in bait fishing-hooks; and it consists in the construction and arrangement of a simple device which supports the bait securely, preventing its becoming detached and operating in such a way as to firmly engage the fish. I am aware that there are some fishing-hooks of this nature; but they are expensive and complicated, they injure the minnow, so that it soon dies, and they prevent the minnow from retaining its natural position in the water, and with them the fish must attack the tail end of the minnow, something which a game-fish seldom, if ever, does.

The object of the present invention is to provide a bait-holding hook which shall be free from these objections; and to accomplish this end the invention consists in features of novelty and simplicity that are designated in the claims hereinafter specified.

In describing this invention reference is had to the annexed drawings, forming a part of this specification, in which like letters refer to corresponding parts in all the views.

The invention is illustrated in the accompanying drawings, in which—

Figure 1 is a side view of my invention, showing a minnow in place on the bait-holder. Fig. 2 is a similar view showing the positions assumed by the parts when a fish seizes the bait, and Fig. 3 is a side view of the bait-holder removed from the hook.

In the drawings, A represents a fish-hook, which may be of any desired form, such as those used for catching game-fish. The bait-holder is represented by the letter B. It is preferably of steel or other spring metal. The holder in the embodiment of the invention here shown is composed of a single piece of metal bent upon itself to form an eye D, which is of a size to receive and freely move upon the body of the hook—that is, that part between the barb and the end to which a line is attached—the eye being, however, too small to allow either barb or the upper end of the hook to pass through it. The result of this construction is to allow free movement of the holder lengthwise and laterally of the hook to assume different positions under varying conditions and at the same time to keep it in close proximity to the point of the hook.

The two arms of the holder B diverge from the eye D, leaving a space between them to receive the bait, and the extreme end of each arm is provided with an inwardly-bent point. These points are designed to pierce the sides of a minnow for a short distance on each side, preferably only to pierce through the skin, with the desirable result that the bait is securely held without killing it.

In the use of the device a minnow is grasped in one hand and the arms of the holder B spread apart with the other. The bait is placed between the points and the latter are then released, allowing the points to enter the sides of the minnow.

When a fish attacks the bait, the line will tighten, the bait-holder will slide toward the point of the hook, and the point will, as shown in Fig. 2, be turned from the fish, making it possible for it to enter the fish's mouth. A jerk or tightening of the line after the bait is swallowed will invariably result in impaling the fish.

The advantage of the present form of bait-holder will at once be apparent to persons familiar with the habits of game-fish, for the capture of which the hook with the described attachment is particularly designed, as by it the minnow is allowed free and natural action in the water, and being only slightly injured by the holder will remain alive for a long time. Besides, immediately upon the seizing of the bait by a fish the bait-holder is moved into close proximity to the point of the hook, presenting the latter in a position to enter the mouth and to insure its engaging the fish.

Having thus described my invention, what I claim as new, and desire to secure by Letters Patent, is—

1. A fish-hook, having combined therewith a holder having an eye receiving the body of the hook between the barb and the upper end thereof, and capable of moving freely thereon and having two arms each provided with a short inwardly-projecting point, substantially as described.

2. A fish-hook having combined therewith a holder composed of spring metal bent to form an eye, which eye receives the body of the hook and having two arms diverging from the eye, each arm being provided at its end with a short inwardly-projecting point, the eye being of a size to receive the body of the hook and to allow the latter to move freely thereon, and being too small to allow the barb and upper end of the hook to pass through it, substantially as described.

In testimony whereof I affix my signature in the presence of two witnesses.

J. MARTIN STADEL.

Witnesses:
 WALTER BACON,
 HARRY WHITEMAN.